Patented Aug. 11, 1942

2,292,684

UNITED STATES PATENT OFFICE 2,292,684

METHOD OF DIFFERENTIALLY OPACIFYING GLASS

Henry H. Blau, Elmira, N. Y., assignor to Corning Glass Works, Corning, N. Y., a corporation of New York No Drawing. Application June 10, 1941, Serial No. 397,497

4 Claims. (Cl. 49—88)

This invention relates to methods of differentially opacifying glass by heating a selected portion thereof. In my prior patent, Number 1,778,305, is shown a method of treating a light-source-enclosing globe composed of a thermally opacifyable glass by inserting the bottom portion of the formed globe in an opening in the wall of a gas fired furnace. By that method only a uniformly complete or continuous portion, such as a half, of the globe could be treated and it was not possible to heat discontinuous selected parts as for the purpose of forming a design.

The primary object of this invention is to form a design in and on a glass article by differential opacification thereof.

Another object is to heat treat discontinuous selected portions of a glass article simultaneously.

Another object is to opacify an area of a glass article while preventing opacification of selected regions within the area.

The above objects may be accomplished by applying to selected portions of the glass, which are not to be heated or opacified, a "thermal resist" which is opaque to radiation and which has a low heat conductivity and then heat treating the article either as a whole or in part.

The thermal resist preferably comprises a relatively inert material having thermal insulating properties such as infusorial earth bonded and attached to the glass by a soluble salt or other soluble substance which will remain substantially unfused at the temperature to be employed for opacification. A number of salts fulfill these requirements, for example, the bromides and chlorides of barium, calcium and magnesium, barium nitrate, etc. In preparing the "resist" the insulating material, preferably infusorial earth, is mixed with a small amount of the salt and sufficient water to form a paste or slurry. The mixture is applied to the portions of the glass article which are to be protected from the heat. On drying, the salt causes cohesion of the insulating material and furnishes adhesion to the glass sufficient for the purpose in view.

The article thus selectively coated with the thermal resist may be heated by exposure to the heated interior of a furnace or kiln or by means of a molten liquid bath into which the article is dipped. Although opacification of the selectively heated portions of the article occurs at glass temperatures of about 550° C. to 585° C., the temperature of the heat source may be somewhat above this. An exposure of about five minutes to the heat source is generally sufficient for the purpose. When the heat source comprises a molten liquid bath, for example, molten sodium or potassium nitrate or a mixture thereof, it is preferable that the salt contained in the thermal resist should not react therewith to produce effervescence and/or noxious fumes. With the above recited salt bath a thermal resist containing barium nitrate is suitable.

After the glass article has been heated and opacity in the selected portions has been developed to the desired degree, it is cooled and washed with warm water or other solvent. The thermal resist is thereby readily removed and the design appears as opacified and unopacified areas either of which may form the background of the design. When the glass per se is colored through the use of the usual coloring materials, the opacified areas will appear substantially white in contrast to the color of the unopacified areas.

I claim:

1. The method of making a differentially opacified glass article which comprises forming a substantially unopacified article from a thermally opacifiable glass, applying to selected areas of the article a thermal resist comprising a heat insulating material of low thermal conductivity bonded with a soluble salt which is substantially infusible at the opacification temperature of the glass, heating the article at a temperature and for a time sufficient to opacify the unprotected areas and washing off the thermal resist.

2. The method of making a differentially opacified glass article which comprises forming a substantially unopacified article from a thermally opacifiable glass, applying to selected areas of the article a thermal resist comprising infusorial earth and a soluble salt which is substantially infusible at the opacification temperature of the glass, heating the article at a temperature and for a time sufficient to opacify the unprotected areas and washing off the thermal resist.

3. The method of making a differentially opacified glass article which comprises forming a substantially unopacified article from a thermally opacifiable glass, applying to selected areas of the article a thermal resist comprising infusorial earth and barium nitrate, heating the article at a temperature and for a time sufficient to opacify the unprotected areas and washing off the thermal resist.

4. The method of making a differentially opacified glass article which comprises forming a substantially unopacified article from a thermally opacifiable glass, applying to selected areas of the article a thermal resist comprising infusorial earth and barium nitrate, dipping the article in a bath of molten alkali nitrate heated to a temperature of about 600° C. for about five minutes, and washing off the resist.

HENRY H. BLAU.